US012527348B2

(12) United States Patent
Dittmann et al.

(10) Patent No.: US 12,527,348 B2
(45) Date of Patent: Jan. 20, 2026

(54) AEROSOL GENERATOR COMPRISING A SURFACE ACOUSTIC WAVE ATOMISER

(71) Applicant: Philip Morris Products S.A., Neuchatel (CH)

(72) Inventors: Leander Dittmann, Neuchatel (CH); Robert Emmett, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 505 days.

(21) Appl. No.: 17/787,799

(22) PCT Filed: Nov. 19, 2020

(86) PCT No.: PCT/EP2020/082683
§ 371 (c)(1),
(2) Date: Jun. 21, 2022

(87) PCT Pub. No.: WO2021/129987
PCT Pub. Date: Jul. 1, 2021

(65) Prior Publication Data
US 2023/0015769 A1 Jan. 19, 2023

(30) Foreign Application Priority Data
Dec. 23, 2019 (EP) .................................... 19219413

(51) Int. Cl.
*A24F 40/05* (2020.01)
*A24F 40/10* (2020.01)
(Continued)

(52) U.S. Cl.
CPC .............. *A24F 40/05* (2020.01); *A24F 40/10* (2020.01); *A24F 40/48* (2020.01); *A24F 40/50* (2020.01); *B05B 17/0661* (2013.01)

(58) Field of Classification Search
None
See application file for complete search history.

(56) References Cited

U.S. PATENT DOCUMENTS 3,938,062 A 2/1976 Hopp
5,325,704 A 7/1994 Mariani et al.
(Continued)

FOREIGN PATENT DOCUMENTS

CN 106163307 A 11/2016
CN 108294364 A 7/2018
(Continued)

OTHER PUBLICATIONS

International Search Report & Written Opinion issued Jan. 14, 2021 in PCT/EP2020/082683 filed on Nov. 19, 2020, 13 pages.
(Continued)

*Primary Examiner* — Philip Y Louie
*Assistant Examiner* — Jeffrey A. Buckman
(74) *Attorney, Agent, or Firm* — Oblon, McClelland, Maier & Neustadt, L.L.P.

(57) ABSTRACT

An aerosol-generator for an aerosol-generating device is provided, the aerosol-generator including: a surface acoustic wave atomiser including a substrate including an active surface defining an atomisation region, and a transducer disposed on the active surface of the substrate; a supply element arranged to supply a liquid aerosol-forming substrate to the atomisation region; and a controller configured to operate the transducer as an input transducer to generate surface acoustic waves on the active surface of the substrate, operate the transducer as an output transducer to sense surface acoustic waves on the active surface of the substrate, and receive an output signal from the transducer when the transducer is operated as the output transducer. An aerosol-generating device including the aerosol-generator is also provided.

8 Claims, 5 Drawing Sheets

(51) Int. Cl.

| | |
|---|---|
| ***A24F 40/48*** | (2020.01) |
| ***A24F 40/50*** | (2020.01) |
| ***B05B 17/06*** | (2006.01) |

(56) References Cited

U.S. PATENT DOCUMENTS

| | | | | |
|---|---|---|---|---|
| 2013/0306084 | A1 | 11/2013 | Flick | |
| 2015/0245654 | A1 | 9/2015 | Memari et al. | |
| 2015/0245655 | A1 | 9/2015 | Memari et al. | |
| 2015/0245656 | A1 | 9/2015 | Memari et al. | |
| 2015/0245657 | A1 | 9/2015 | Memari et al. | |
| 2015/0245662 | A1 | 9/2015 | Memari et al. | |
| 2015/0245663 | A1 | 9/2015 | Memari et al. | |
| 2015/0245664 | A1 | 9/2015 | Memari et al. | |
| 2015/0245665 | A1 | 9/2015 | Memari et al. | |
| 2015/0245666 | A1 | 9/2015 | Memari et al. | |
| 2015/0245667 | A1 | 9/2015 | Memari et al. | |
| 2015/0245668 | A1 | 9/2015 | Memari et al. | |
| 2015/0359266 | A1 | 12/2015 | Memari et al. | |
| 2016/0150824 | A1 | 6/2016 | Memari et al. | |
| 2016/0192712 | A1 | 7/2016 | Memari et al. | |
| 2016/0192713 | A1 | 7/2016 | Memari et al. | |
| 2017/0280771 | A1* | 10/2017 | Courbat | B05B 17/0661 |
| 2017/0360105 | A1 | 12/2017 | Memari et al. | |
| 2017/0360106 | A1 | 12/2017 | Memari et al. | |
| 2017/0360107 | A1 | 12/2017 | Memari et al. | |
| 2017/0360108 | A1 | 12/2017 | Memari et al. | |
| 2017/0360109 | A1 | 12/2017 | Memari et al. | |
| 2017/0360110 | A1 | 12/2017 | Memari et al. | |
| 2017/0360111 | A1 | 12/2017 | Memari et al. | |
| 2017/0360112 | A1 | 12/2017 | Memari et al. | |
| 2017/0360113 | A1 | 12/2017 | Memari et al. | |
| 2017/0360114 | A1 | 12/2017 | Memari et al. | |
| 2017/0360115 | A1 | 12/2017 | Memari et al. | |
| 2017/0360116 | A1 | 12/2017 | Memari et al. | |
| 2018/0000162 | A1 | 1/2018 | Memari et al. | |
| 2018/0000163 | A1 | 1/2018 | Memari et al. | |
| 2018/0049474 | A1 | 2/2018 | Memari et al. | |
| 2018/0049475 | A1 | 2/2018 | Memari et al. | |
| 2018/0146710 | A1* | 5/2018 | Bessant | H05B 1/0227 |
| 2018/0271158 | A1 | 9/2018 | Memari et al. | |
| 2018/0271159 | A1 | 9/2018 | Memari et al. | |
| 2018/0271160 | A1 | 9/2018 | Memari et al. | |
| 2018/0271161 | A1 | 9/2018 | Memari et al. | |
| 2018/0271162 | A1 | 9/2018 | Memari et al. | |
| 2018/0271163 | A1 | 9/2018 | Memari et al. | |
| 2018/0271164 | A1 | 9/2018 | Memari et al. | |
| 2018/0271165 | A1 | 9/2018 | Memari et al. | |
| 2018/0271166 | A1 | 9/2018 | Memari et al. | |
| 2018/0271167 | A1 | 9/2018 | Memari et al. | |
| 2018/0335280 | A1 | 11/2018 | Flick | |
| 2019/0069603 | A1 | 3/2019 | Memari et al. | |
| 2020/0008483 | A1 | 1/2020 | Memari et al. | |
| 2020/0008484 | A1 | 1/2020 | Memari et al. | |
| 2020/0008485 | A1 | 1/2020 | Memari et al. | |
| 2020/0008486 | A1 | 1/2020 | Memari et al. | |
| 2020/0008487 | A1 | 1/2020 | Memari et al. | |
| 2020/0008488 | A1 | 1/2020 | Memari et al. | |
| 2020/0008489 | A1 | 1/2020 | Memari et al. | |
| 2020/0008490 | A1 | 1/2020 | Memari et al. | |
| 2020/0008491 | A1 | 1/2020 | Memari et al. | |
| 2020/0008492 | A1 | 1/2020 | Memari et al. | |
| 2020/0022420 | A1 | 1/2020 | Memari et al. | |
| 2020/0214352 | A1 | 7/2020 | Memari et al. | |
| 2020/0232766 | A1 | 7/2020 | Flick | |
| 2021/0112882 | A1* | 4/2021 | Hejazi | A24F 40/40 |

FOREIGN PATENT DOCUMENTS

| | | | |
|---|---|---|---|
| CN | 108697178 | A | 10/2018 |
| EP | 2 870 888 | A1 | 5/2015 |
| JP | 4-189145 | A | 7/1992 |
| JP | 2008-104966 | A | 5/2008 |
| JP | 2018-139628 | A | 9/2018 |
| JP | 2019-513353 | A | 5/2019 |
| KR | 10-2016-0121777 | | 11/2018 |
| RU | 2 465 965 | C1 | 11/2012 |
| RU | 2 680 428 | C2 | 2/2019 |
| WO | WO 2017/167521 | A1 | 10/2017 |

OTHER PUBLICATIONS

Russian Office Action and Search Report mailed on March 11, 2024 in corresponding Russian Patent Application No. 2022119806), 14 pages.

Extended European Search Report issued on Jul. 1, 2020 in European Patent Application No. 19219413.2, 9 pages.

Office Action issued Dec. 2, 2024, in corresponding Japanese Patent Application No. 2022-538440, 3 pages.

Chinese Office Action and Search Report issued Mar. 29, 2025 in corresponding Chinese Patent Application No. 202080089322.1, with English Translation, 30 pages.

Korean Office Action issued May 12, 2025 in corresponding Korean Patent Application No. 2022-7025060. with English Translation, 11 pages.

* cited by examiner

AEROSOL GENERATOR COMPRISING A SURFACE ACOUSTIC WAVE ATOMISER

The present disclosure relates to aerosol generators for an aerosol-generating device, the aerosol generators comprising a surface acoustic wave atomiser and a supply element. The present disclosure also relates to aerosol-generating devices comprising the aerosol generators.

Aerosol-generating systems in which an aerosol-forming substrate is heated rather than combusted are known in the art. Typically in such aerosol-generating systems, an aerosol is generated by the transfer of energy from an aerosol generator of an aerosol-generating device to an aerosol-forming substrate. For example, known aerosol-generating devices comprise a heater arranged to heat and vaporise a liquid aerosol-forming substrate.

It is desirable to provide a consistent user experience for a user of an aerosol-generating device. However, known aerosol-generating devices may provide insufficient control of the rate at which a liquid aerosol-forming substrate is supplied to an aerosol generator, such as a heater. Known aerosol-generating devices may also provide insufficient control of the rate at which an aerosol generator vaporises a liquid aerosol-forming substrate. Both of these shortcomings may result in an inconsistent user experience.

It would be desirable to provide an aerosol generator for an aerosol-generating device that provides improved control of the rate at which a liquid aerosol-forming substrate is supplied to an atomisation region of the aerosol generator.

It would be desirable to provide an aerosol generator for an aerosol-generating device that provides improved control of the rate at which a liquid aerosol-forming substrate is atomised from an atomisation region of the aerosol generator.

In a disclosure, an aerosol generator for an aerosol-generating device is provided. The aerosol generator may comprise a surface acoustic wave atomiser. The surface acoustic wave atomiser may comprise a substrate comprising an active surface defining an atomisation region. The surface acoustic wave atomiser may comprise a transducer positioned on the active surface of the substrate. The aerosol generator may comprise a supply element arranged to supply a liquid aerosol-forming substrate to the atomisation region. The aerosol generator may comprise a controller arranged to operate the transducer. The controller may be configured to operate the transducer as an input transducer for generating surface acoustic waves on the active surface of the substrate. The controller may be configured to operate the transducer as an output transducer for sensing surface acoustic waves on the active surface of the substrate. The controller may be configured to receive an output signal from the transducer when the transducer is operated as an output transducer.

In this disclosure, an aerosol generator for an aerosol-generating device is provided, the aerosol generator comprising:

a surface acoustic wave atomiser comprising:

- a substrate comprising an active surface defining an atomisation region; and
- a transducer positioned on the active surface of the substrate;

a supply element arranged to supply a liquid aerosol-forming substrate to the atomisation region; and a controller arranged to operate the transducer, wherein the controller is configured to operate the transducer as an input transducer for generating surface acoustic waves on the active surface of the substrate, and wherein the controller is configured to operate the transducer as an output transducer for sensing surface acoustic waves on the active surface of the substrate, the controller being configured to receive an output signal from the transducer when the transducer is operated as an output transducer.

The term "surface acoustic wave" is used herein to include Rayleigh waves, Lamb waves and Love waves.

Atomising a liquid aerosol-forming substrate using a surface acoustic wave atomiser may advantageously provide improved control of the atomisation process when compared to other known aerosol generators, such as electric heaters. In other words, the surface acoustic wave atomiser of aerosol generators according to the present disclosure provides reliable and consistent amounts of atomised liquid aerosol-forming substrate.

The power required by a surface acoustic wave atomiser for atomising a liquid aerosol-forming substrate may advantageously be less than the power required for atomising the same amount of liquid aerosol-forming substrate using known aerosol generators, such as electric heaters.

The controller may be configured to operate the transducer as an input transducer for generating surface acoustic waves on the active surface of the substrate. The controller may also be configured to operate the transducer as an output transducer for sensing surface acoustic waves on the active surface of the substrate. Put another way, a single transducer may be operated both as an input transducer and as an output transducer. This may be advantageous in that a sensor comprising an input transducer and an output transducer may be formed with a single transducer. As a result, an aerosol generator comprising a sensor may be obtained minimising the number and cost of electronic elements.

The provision of a sensor configured to sense the liquid aerosol-forming substrate supplied to the atomisation region by a supply element may be beneficial in that a sample of the liquid aerosol-forming substrate may be sensed by the sensor. This may be advantageous in that certain properties of the sensed liquid aerosol-forming substrate may be measured or estimated. Among other properties, values of temperature, mass, viscosity and chemical composition of the aerosol may be measured or estimated by the sensor.

The transducer, when operated as an output transducer, generates an output signal which may be a function of the properties of the sensed liquid aerosol-forming substrate. The output signal may be sent to the controller so as to adapt control parameters of the transducer, the flow control element or any other component of the aerosol generator. This may enable for an optimised performance of the aerosol generator when atomising the liquid aerosol-forming substrate.

When the sensor comprises a single transducer, the optimisation may be achieved with a reduced cost and less electronic components.

The aerosol generator may comprise a reflector located on the active surface of the substrate, wherein the atomisation region is positioned between the transducer and the reflector.

The reflector may advantageously reflect surface acoustic waves generated by the transducer towards the atomisation region and towards the transducer. This may increase or maximise the efficiency of the surface acoustic wave atomiser. It may also contribute to ensuring that satisfactory sensing functions are achieved with a single transducer.

The reflector may comprise one or more electrodes.

The reflector may comprise one or more portions of metal positioned on the active surface of the substrate. Each portion of metal may have a linear shape. Each portion of metal may have a curved shape. The reflector may comprise a plurality of portions of metal. The plurality of portions of metal may be arranged in a pattern on the active surface of the substrate. Preferably, each portion of metal is substantially parallel to the adjacent portions of metal forming the reflector.

A portion of the substrate may form at least part of the reflector. The substrate may define at least one protrusion, wherein the at least one protrusion forms at least part of the reflector. The substrate may define at least one recess, wherein the at least one recess forms at least part of the reflector.

The reflector may be a single reflector. A plurality of reflectors may also be provided.

The controller may be configured to provide an input signal to the transducer when the transducer is operated as an input transducer, the controller being configured to vary the input signal to control the input transducer based on the output signal received by the controller from the transducer when the transducer is operated as an output transducer.

An explained above, the output signal may be generated by the transducer, when operated as an output transducer, as a function of the properties of the liquid aerosol-forming substrate in the atomisation region. Upon reception of such output signal, the controller may generate an input signal to control the input transducer. This may allow the input transducer to generate surface acoustic waves that improve or enhance the atomisation of the liquid aerosol-forming substrate in the atomisation region.

The aerosol generator may comprise a flow control element arranged to control a flow rate of liquid aerosol-forming substrate supplied to the atomisation region by the supply element, the controller being configured to provide an input signal to the flow control element, the controller being also configured to vary the input signal based on the output signal received by the controller from the transducer when the transducer is operated as an output transducer.

Upon reception of the output signal, the controller may generate an input signal to control a flow control element. This may allow the supply element to calibrate the flow rate of liquid aerosol-forming substrate provided to the atomisation region. Consequently, the atomisation of the liquid aerosol-forming substrate in the atomisation region may be improved or enhanced.

In an example, the output signal is associated to an insufficient amount of liquid aerosol-forming substrate in the atomisation region. The controller generates an input signal sent to the flow control element, such that the flow control element increases the flow of liquid aerosol-forming substrate supplied to the atomisation region by the supply element.

The flow control element may comprise at least one passive element. The at least one passive element may comprise at least one of a capillary tube and a capillary wick.

The flow control element may comprise at least one active element. The at least one active element may comprise at least one of a micro pump, a syringe pump, a piston pump, and an electroosmotic pump. Preferably, the controller is arranged to provide an input signal to the at least one active element to control a flow rate of liquid aerosol-forming substrate from a liquid storage portion to a channel of the supply element. The liquid storage portion may be part of an aerosol-generating device. The flow control element may comprise a valve.

The transducer may be a first transducer, the reflector may be a first reflector and the surface acoustic wave atomiser may further comprise:

a second transducer positioned on the active surface of the substrate, wherein the controller is configured to operate the second transducer as an input transducer for generating surface acoustic waves on the active surface of the substrate, and wherein the controller is configured to operate the second transducer as an output transducer for sensing surface acoustic waves;

a second reflector positioned to reflect the surface acoustic waves generated by the second transducer when operated as an input transducer, such that the reflected surface acoustic waves are received by the second transducer when operated as an output transducer;

wherein the controller is configured to receive an output signal from the second transducer when the second transducer is operated as an output transducer, and wherein the atomisation region is positioned only between the first transducer and the first reflector.

Since the atomisation region is positioned only between the first transducer and the first reflector, the second transducer may be configured to form a reference sensor. As used herein, “reference sensor” is construed as a sensor configured to work permanently with no sensed load.

As explained above, the first transducer may be configured to form a sensor configured to sense the liquid aerosol-forming substrate within the atomisation region. In use, the first transducer, when operated by the controller as an output transducer, generates an output signal, which may be a function of the properties of the sensed liquid aerosol-forming substrate. Likewise, the second transducer, when operated by the controller as an output transducer, may generate an output signal, which may be independent from the properties of the liquid aerosol-forming substrate in the atomisation region. The output signal of the second transducer can advantageously be used as a reference output signal.

The output signals from the first and second transducers may be received by the controller. The controller may compare the output signal of the first transducer, which may be a function of the properties of the liquid aerosol-forming substrate, with the reference output signal of the second transducer.

The comparison of the output signal of the first transducer and the reference output signal of the second transducer may advantageously be used to adapt control parameters of the first and second transducer, when operated by the controller as input transducers, the flow control element or any other component of the aerosol generator. This may enable for an optimised performance of the aerosol generator when atomising the liquid aerosol-forming substrate.

In a disclosure of the invention, an aerosol generator for an aerosol-generating device is provided. The aerosol generator may comprise a surface acoustic wave atomiser. The surface acoustic wave atomiser may comprise a substrate comprising an active surface defining an atomisation region. The surface acoustic wave atomiser may comprise a first transducer, a second transducer, a third transducer and a fourth transducer, each positioned on the active surface of the substrate. The aerosol generator may comprise a supply element arranged to supply a liquid aerosol-forming substrate to the atomisation region. The aerosol generator may comprise a controller arranged to operate the first transducer, the second transducer, the third transducer and the fourth transducer. The controller may be configured to operate each of the first transducer and the second transducer as an input transducer for generating surface acoustic waves on the active surface of the substrate. The third transducer may be positioned to receive surface acoustic waves generated by the first transducer. The controller may be configured to operate the third transducer as an output transducer for sensing surface acoustic waves generated by the first transducer. The controller may configured to receive an output signal from the third transducer. The fourth transducer may be positioned to receive surface acoustic waves generated by the second transducer. The controller may be configured to operate the fourth transducer as an output transducer for sensing surface acoustic waves generated by the second transducer. The controller may be configured to receive an output signal from the fourth transducer. The atomisation region may be positioned only between the first transducer and the third transducer.

In this disclosure, an aerosol generator for an aerosol-generating device may be provided, the aerosol generator comprising:

- a surface acoustic wave atomiser comprising:
  - a substrate comprising an active surface defining an atomisation region; and
  - a first transducer, a second transducer, a third transducer and a fourth transducer, each positioned on the active surface of the substrate;
- a supply element arranged to supply a liquid aerosol-forming substrate to the atomisation region; and
- a controller arranged to operate the first transducer, the second transducer, the third transducer and the fourth transducer;
- wherein the controller is configured to operate each of the first transducer and the second transducer as an input transducer for generating surface acoustic waves on the active surface of the substrate;
- wherein the third transducer is positioned to receive surface acoustic waves generated by the first transducer, and wherein the controller is configured to operate the third transducer as an output transducer for sensing surface acoustic waves generated by the first transducer, the controller being configured to receive an output signal from the third transducer;
- wherein the fourth transducer is positioned to receive surface acoustic waves generated by the second transducer, and wherein the controller is configured to operate the fourth transducer as an output transducer for sensing surface acoustic waves generated by the second transducer, the controller being configured to receive an output signal from the fourth transducer; and
- wherein the atomisation region is positioned only between the first transducer and the third transducer.

Since the atomisation region is positioned only between the first transducer and the third transducer, the second transducer and the fourth transducer may be configured to form a reference sensor.

The first transducer and the third transducer may be configured to form a sensor configured to sense the liquid aerosol-forming substrate within the atomisation region.

The second transducer may generate an output signal, which may be a function of the properties of the sensed liquid aerosol-forming substrate.

The fourth transducer may generate an output signal, which may be independent from the properties of the liquid aerosol-forming substrate in the atomisation region. The output signal of the fourth transducer can advantageously be used as a reference output signal.

The output signals from the second and fourth transducers may be received by the controller. The controller may compare the output signal of the third transducer, which may be a function of the properties of the liquid aerosol-forming substrate, with the reference output signal of the fourth transducer.

The comparison of the output signal of the third transducer and the reference output signal of the fourth transducer may advantageously be used to adapt control parameters of the first transducer, a flow control element or any other component of the aerosol generator. This may enable for an optimised performance of the aerosol generator when atomising the liquid aerosol-forming substrate.

The controller may be configured to provide a first input signal to the first transducer and a second input signal to the second transducer, the controller being configured to vary the first input signal to control the first input transducer and the second input signal to control the second input transducer based on a comparison between the output signal received by the controller from the third transducer and the output signal received by the controller from the fourth transducer.

The comparison between the output signal of the third transducer and the reference output signal of the fourth transducer may advantageously be used by the controller to generate input signals to control the first transducer and the second transducer. This may allow the first transducer to generate surface acoustic waves that improve or enhance the atomisation of the liquid aerosol-forming substrate in the atomisation region. This may also allow the second transducer to generate surface acoustic waves that are suitable to generate a reference output signal in the fourth transducer than can be easily compared to the output signal of the third transducer.

The second input signal may be identical to the first input signal. This may be beneficial to ensure that the comparison between the output signal of the third transducer and the reference output signal of the fourth transducer is consistent.

The aerosol generator may comprise a flow control element arranged to control a flow rate of liquid aerosol-forming substrate supplied to the atomisation region by the supply element, the controller being configured to provide an input signal to the flow control element, the controller being configured to vary the input signal based on a comparison between the output signal received by the controller from the third transducer and the signal received by the controller from the fourth transducer.

The comparison between the output signal of the third transducer and the output signal of the fourth transducer, which may be a reference signal, may advantageously be used by the controller to generate an input signal to control a flow control element. This may allow the supply element to calibrate the flow of liquid aerosol-forming substrate provided to the atomisation region. Consequently, the atomisation of the liquid aerosol-forming substrate in the atomisation region may be improved or enhanced.

In a disclosure, an aerosol generator for an aerosol-generating device may be provided. The aerosol generator may comprise a surface acoustic wave atomiser. The surface acoustic wave atomiser may comprise a substrate comprising an active surface defining an atomisation region. The surface acoustic wave atomiser may comprise a first transducer positioned on the active surface of the substrate. The surface acoustic wave atomiser may comprise a second transducer positioned on the active surface of the substrate, wherein the atomisation region is positioned between the first transducer and the second transducer. The aerosol generator may comprise a supply element arranged to supply a liquid aerosol-forming substrate to the atomisation region. The aerosol generator may comprise a controller arranged to operate the first transducer and the second transducer. The controller may be configured to operate the first transducer as an input transducer for generating surface acoustic waves on the active surface of the substrate. The second transducer may be positioned to receive surface acoustic waves generated by the first transducer. The controller may be configured to operate the second transducer as an output transducer for sensing surface acoustic waves generated by the first transducer, such that the second transducer provides an output signal. The aerosol generator may comprise an amplifier, wherein the surface acoustic wave atomiser is arranged as a feedback line for the amplifier, such that the amplifier is configured to receive the output signal for the second transducer and to provide an amplifier output signal. The aerosol generator may comprise an analyser arranged to receive the amplifier output signal and provide an analyser output signal to the controller.

In this disclosure, an aerosol generator for an aerosol-generating device may be provided, the aerosol generator comprising:

- a surface acoustic wave atomiser comprising:
  - a substrate comprising an active surface defining an atomisation region;
  - a first transducer positioned on the active surface of the substrate; and
  - a second transducer positioned on the active surface of the substrate, wherein the atomisation region is positioned between the first transducer and the second transducer;
- a supply element arranged to supply a liquid aerosol-forming substrate to the atomisation region;
- a controller arranged to operate the first transducer and the second transducer, wherein the controller is configured to operate the first transducer as an input transducer for generating surface acoustic waves on the active surface of the substrate, the second transducer being positioned to receive surface acoustic waves generated by the first transducer, and wherein the controller is configured to operate the second transducer as an output transducer for sensing surface acoustic waves generated by the first transducer, such that the second transducer provides an output signal;
- an amplifier, wherein the surface acoustic wave atomiser is arranged as a feedback line for the amplifier, such that the amplifier is configured to receive the output signal for the second transducer and to provide an amplifier output signal; and
- an analyser arranged to receive the amplifier output signal and provide an analyser output signal to the controller.

By arranging a surface acoustic wave atomiser as a feedback line for an amplifier, the surface acoustic wave atomiser may be advantageously run in an oscillatory scheme by tracking and feeding back the resonance of the feedback line.

In use, a second transducer generates an output signal which may be a function of the properties of a sensed liquid aerosol-forming substrate. The output signal of the second transducer is amplified by the amplifier, which generates an amplifier output signal. The amplifier output signal is received by an analyser which in turns provides an analyser output signal to a controller.

The amplification and analysis of the output signal may be beneficial to allow for a more accurate determination of the properties of the sensed liquid aerosol-forming substrate compared to an aerosol generator wherein the output signal of the second transducer is directly received by the controller.

When the controller receives the analyser output signal, the analyser output signal can advantageously be used to adapt control parameters of a first transducer, a flow control element or any other component of the aerosol generator. This may enable for an optimised performance of the aerosol generator when atomising the liquid aerosol-forming substrate.

The analyser may comprise at least one of a frequency analyser, a power analyser, and a phase analyser.

Frequency analysers, power analysers and phase analysers may allow for an increased accuracy in the determination of the properties of the sensed liquid aerosol-forming substrate.

The controller may be configured to provide an input signal to the first transducer, the controller being configured to vary the input signal to control the first transducer based on the analyser output signal received by the controller.

The analyser output signal may advantageously be used by the controller to generate an input signal to control the first transducer. This may allow the first transducer to generate surface acoustic waves that improve or enhance the atomisation of the liquid aerosol-forming substrate in the atomisation region.

The supply element may comprise a flow control element arranged to control a flow rate of liquid aerosol-forming substrate supplied to the atomisation region by the supply element, the controller being configured to provide an input signal to the flow control element, the controller being configured to vary the input signal based on the analyser output signal.

The analyser output signal may advantageously be used by the controller to generate an input signal to control a flow control element. This may allow the supply element to calibrate the flow of liquid aerosol-forming substrate provided to the atomisation region. Consequently, the atomisation of the liquid aerosol-forming substrate in the atomisation region may be improved or enhanced.

The following preferred and optional features of the aerosol generator may be applied to aerosol generators according to any of the disclosures above.

The at least one transducer may comprise an interdigital transducer comprising a plurality of electrodes. Preferably, the plurality of electrodes are substantially parallel with each other. Preferably, the interdigital transducer comprises a first array of electrodes and a second array of electrodes interleaved with the first array of electrodes. Preferably, the first array of electrodes is substantially parallel with the second array of electrodes.

The transducer may be configured to generate surface acoustic waves having a substantially linear wavefront. In embodiments in which the transducer is an interdigital transducer comprising a plurality of electrodes, each electrode may be substantially linear.

The transducer may be configured to generate surface acoustic waves having a curved wavefront. In embodiments in which the transducer is an interdigital transducer comprising a plurality of electrodes, each electrode may be curved. The transducer may be configured to generate surface acoustic waves having a convex wavefront. Preferably, the transducer may be configured to generate surface acoustic waves having a concave wavefront. Advantageously, a concave wavefront may provide a focussing effect. In other words, a concave wavefront may focus the generated surface acoustic waves towards an atomisation region that is smaller than the transducer. Advantageously, focussing the generated surface acoustic waves may increase the rate at which energy is delivered to a liquid aerosol-forming substrate in the atomisation region.

The substrate is formed of a substrate material. The substrate material may be a piezoelectric material. The substrate material may comprise a monocrystalline material. The substrate material may comprise a polycrystalline material. The substrate material may comprise at least one of quartz, a ceramic, barium titanate ($BaTiO_3$), and lithium niobate ($LiNbO_3$). The ceramic may comprise lead zirconate titanate (PZT). The ceramic may include doping materials such as Ni, Bi, La, Nd or Nb ions. The substrate material may be polarised. The substrate material may be unpolarised. The substrate material may comprise both polarised and unpolarised materials.

The substrate may comprise a surface treatment. The surface treatment may be applied to the active surface of the substrate. The surface treatment may comprise a coating. The coating may comprise a hydrophobic material. The coating may comprise a hydrophilic material. The coating may comprise an oleophobic material. The coating may comprise an oleophilic material.

In a disclosure, an aerosol-generating device is provided. The aerosol-generating device may comprise any of the above aerosol generators. The aerosol-generating device may comprise a power supply. The aerosol-generating device may comprise a liquid storage portion for receiving a liquid aerosol-forming substrate, wherein the supply element is arranged to supply liquid aerosol-forming substrate from the liquid storage portion to the atomisation region.

In this disclosure, an aerosol-generating device may be provided, the aerosol-generating device comprising:

any of the above aerosol generators;

a power supply; and a liquid storage portion for receiving a liquid aerosol-forming substrate, wherein the supply element is arranged to supply liquid aerosol-forming substrate from the liquid storage portion to the atomisation region.

As used herein, the term "aerosol-generating device" refers to a device comprising an aerosol generator configured to interact with an aerosol-forming substrate to generate an aerosol.

As used herein, the term "aerosol-generating system" refers to the combination of an aerosol-generating device and the aerosol-forming substrate or the element comprising the aerosol-forming substrate, such as a cartridge.

Since the aerosol-generating device of this disclosure comprises an aerosol generator according to the previous disclosures, the advantages specified above for the aerosol generators also apply to the device itself.

The liquid storage portion may be reusable. In other words, the at liquid storage portion may be refillable by a user to replenish a liquid aerosol-forming substrate in the at least one liquid storage portion. The at least one liquid storage portion may comprise a refill aperture for inserting a liquid aerosol-forming substrate into the liquid storage portion. The liquid storage portion may comprise a refill valve between the refill aperture and the at least one liquid storage portion. Advantageously, the refill valve may allow a liquid aerosol-forming substrate to flow through the refill aperture into the liquid storage portion. Advantageously, the refill valve may prevent a liquid aerosol-forming substrate from flowing out of the liquid storage portion through the refill aperture.

The liquid storage portion may be replaceable. The liquid storage portion may be removable from the aerosol-generating device. The aerosol-generating device may comprise a cartridge, wherein the cartridge is removable from the aerosol-generating device, and wherein the cartridge comprises the liquid storage portion.

The aerosol-generating device may comprise a liquid aerosol-forming substrate contained within the liquid storage portion.

The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise at least one aerosol-former. An aerosol-former is any suitable known compound or mixture of compounds that, in use, facilitates formation of a dense and stable aerosol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavourants.

The liquid aerosol-forming substrate may comprise water.

The liquid aerosol-forming substrate may comprise nicotine and at least one aerosol former. The aerosol former may comprise glycerine. The aerosol-former may comprise propylene glycol. The aerosol former may comprise both glycerine and propylene glycol. The liquid aerosol-forming substrate may have a nicotine concentration of between about 0.1 percent and about 10 percent.

The controller may comprise electric circuitry connected to the power supply and the at least one transducer. The electric circuitry may comprise a microprocessor. The microprocessor may be a programmable microprocessor, a microcontroller, or an application specific integrated chip (ASIC) or other electronic circuitry capable of providing control. The electric circuitry may comprise further electronic components. The electric circuitry may be configured to regulate a supply of power from the power supply to the at least one transducer. The controller may be configured to supply power continuously to the at least one transducer following activation of the aerosol-generating device. The controller may be configured to supply power intermittently to the at least one transducer. The controller may be configured to supply power to the at least one transducer on a puff-by-puff basis.

Preferably, the controller and the power supply are configured to provide an alternating voltage to the at least one transducer. The alternating voltage may be provided by providing an alternating current. Preferably, the alternating voltage is a radio frequency alternating voltage. Preferably, the alternating voltage has a frequency of at least about 20 megahertz. Preferably, the alternating voltage has a frequency of between about 20 megahertz and about 100 megahertz, more preferably between about 20 megahertz and about 80 megahertz. Advantageously, an alternating voltage within these ranges may provide as least one of a desired rate of aerosol generating and a desired droplet size.

The power supply may be any suitable type of power supply. The power supply may be a DC power supply. In some preferred embodiments, the power supply is a battery, such as a rechargeable lithium ion battery. The power supply may be another form of charge storage device, such as a capacitor. The power supply may require recharging. The power supply may have a capacity that allows for the storage of enough energy for one or more uses of the device. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of uses of the device or discrete activations. In one embodiment, the power supply is a DC power supply having a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts).

The aerosol-generating device may advantageously comprise a DC/AC inverter, which may comprise a Class-C, Class-D or Class-E power amplifier. The DC/AC inverter may be arranged between the power supply and the at least one transducer.

The aerosol-generating device may further comprise a DC/DC converter between the power supply and the DC/AC inverter.

The aerosol-generating device may comprise a device housing. The device housing may be elongate. The device housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The device housing may define an air inlet. The air inlet may be configured to enable ambient air to enter the device housing. The air inlet may be in fluid communication with the atomisation region of the aerosol generator. The device may comprise any suitable number of air inlets. The device may comprise a plurality of air inlets.

The device housing may comprise an air outlet. The air outlet may be configured to enable air to exit the device housing for delivery to a user. The air outlet may be in fluid communication with the atomisation region of the aerosol generator. The aerosol-generating device may comprise a mouthpiece. The mouthpiece may comprise the air outlet. The device may comprise any suitable number of air outlets. The device may comprise a plurality of air outlets.

These and other features and advantages of the invention will become more evident in the light of the following detailed description of preferred embodiments, given only by way of illustrative and non-limiting example, in reference to the attached figures.

Figure 1:
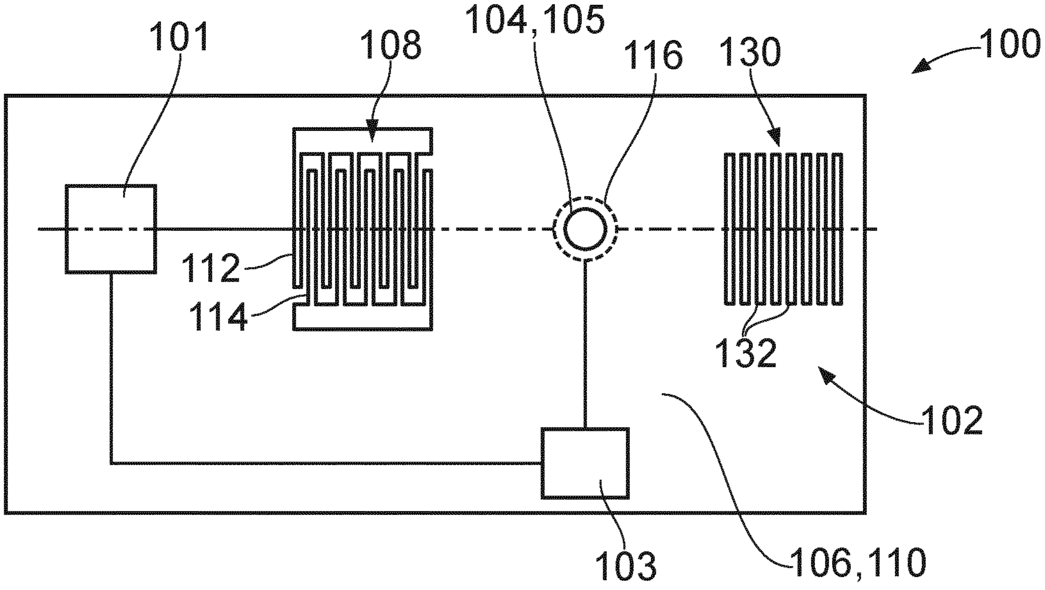
FIG. 1 shows a top view of an aerosol generator comprising a transducer and a reflector.

The aerosol generator 100 of the embodiment of FIG. 1 comprises a controller 101, a surface acoustic wave atomiser 102, a flow control element 103 and a supply element 104.

The surface acoustic wave atomiser 102 comprises a substrate 106 comprising a sheet of piezoelectric material, and a transducer 108 arranged on an active surface 110 of the substrate 106. The transducer 108 comprises a first array of electrodes 112 and a second array of electrodes 114 interleaved with the first array of electrodes 112. The first and second arrays of electrodes 112, 114 are linear and parallel with each other. During use, the transducer 108 generates surface acoustic waves on the active surface 110 of the substrate 106. The linear shape of the first and second arrays of electrodes 112, 114 results in surface acoustic waves having a linear wavefront directed towards an atomisation region 116 on the active surface 110 of the substrate 106.

The controller 101 is configured to operate the transducer 108. For this reason, the controller 101 is electrically connected to the transducer 108. The controller 101 is configured to operate the transducer 108 as an input transducer for generating surface acoustic waves on the active surface 110 of the substrate 106. The controller 101 is also configured to operate the transducer 108 as an output transducer for sensing surface acoustic waves on the active surface 110 of the substrate 106.

The supply element 104 comprises a channel extending through the substrate 106 between an inlet at a passive surface of the substrate (not represented) and an outlet 105 at the active surface 110 of the substrate 106. The outlet 105 is positioned within the atomisation region 116. During use, a liquid aerosol-forming substrate is supplied through the channel to the atomisation region 116 where it is atomised by surface acoustic waves generated by the transducer 108.

The aerosol generator 100 also comprises a reflector 130 positioned on the active surface 110 of the substrate 106 so that the atomisation region 116 is positioned between the transducer 108 and the reflector 130. The reflector 130 comprises an array of reflector electrodes 132, each having a linear shape and arranged parallel with each other and the first and second arrays 112, 114 of electrodes of the transducer 108. During use, some of the surface acoustic waves generated by the transducer 108 may be transmitted entirely through the atomisation region 116, for example if a small amount of liquid aerosol-forming substrate, or no liquid aerosol-forming substrate, is deposited on the atomisation region 116. The reflector 130 functions to reflect any transmitted surface acoustic waves back towards the atomisation region 116 and towards the transducer 108. When the reflected surface acoustic waves reach the transducer 108, the controller 101 operates the transducer 108 as an output transducer for sensing the reflected surface acoustic waves.

Since the transducer 108 can be operated as an input transducer and an output transducer, the transducer 108 forms a sensor which can sense a sample of the liquid aerosol-forming substrate on the atomisation region 116. When the transducer 108 is operated as an output transducer, it generates an output signal which is a function of the properties of the sensed liquid aerosol-forming substrate. The output signal is received by the controller 101, which can modify an input signal sent to the transducer 108 when the transducer 108 is operated as an input transducer. As a result of this, the transducer 108 operating as an input transducer adapts the generation of surface acoustic waves to enhance the atomisation of the liquid aerosol-forming substrate.

When the output signal is received by the controller 101, the controller 101 provides an input signal to the flow control element 103. The flow control element 103 adapts a flow rate of the liquid aerosol-forming substrate to the atomisation region 116 on the active surface 110 of the substrate 106, by means of the supply element 104, to enhance the atomisation of liquid aerosol-forming substrate.

Figure 2:
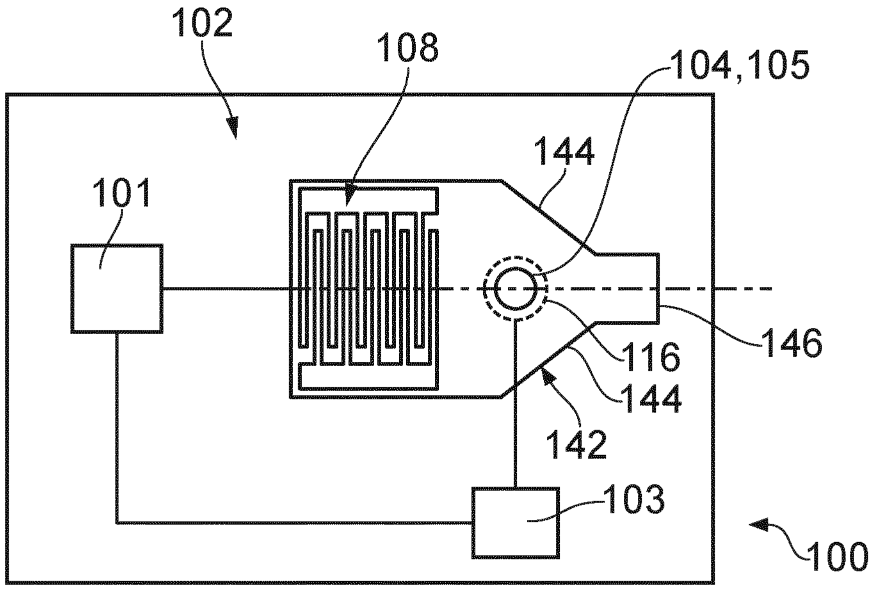
FIG. 2 illustrates a top view of an aerosol generator comprising a transducer and a reflector, wherein the reflector is comprised in a plurality of walls forming a recess.
Figure 3:
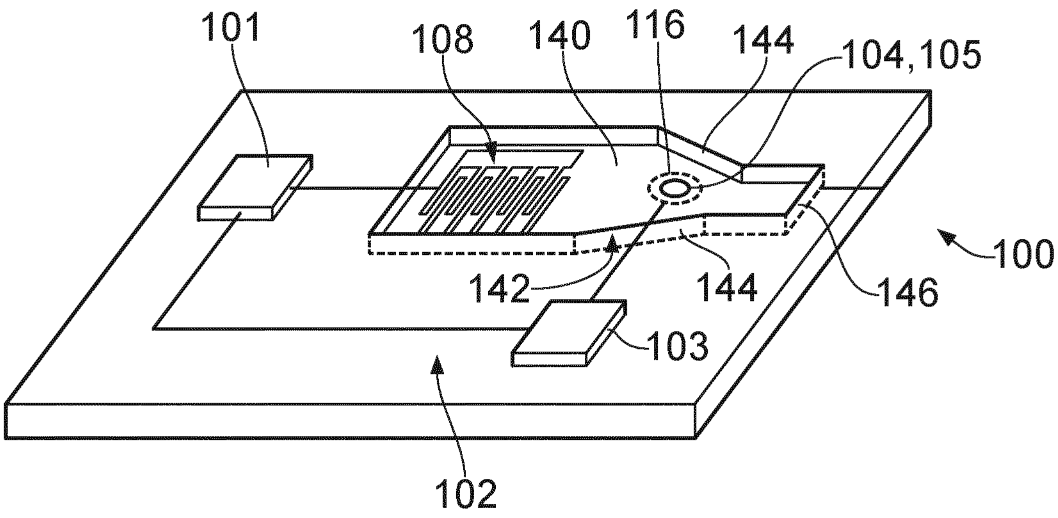
FIG. 3 depicts a perspective view of the aerosol generator of FIG. 2.

FIGS. 2 and 3 show an aerosol generator similar to that of FIG. 1, except in that the reflector 130 is comprised in a plurality of walls 142 defining a recess 140. The plurality of walls 142 comprises a pair of angled walls 144 arranged to reflect surface acoustic waves generated by the transducer 108 towards the atomisation region 116. The plurality of walls 142 also comprises a back wall 146 arranged to reflect any surface acoustic waves propagating from the transducer 108 in a direction away from the atomisation region 116 back towards the atomisation region 116 and towards the transducer 108. When the reflected surface acoustic waves reach the transducer 108, the controller 101 operates the transducer as an output transducer for sensing the reflected surface acoustic waves. The controller 101 can control the transducer 108, when operated as an input transducer, and the flow control element 103 as in the embodiment of FIG. 1.

Figure 4:
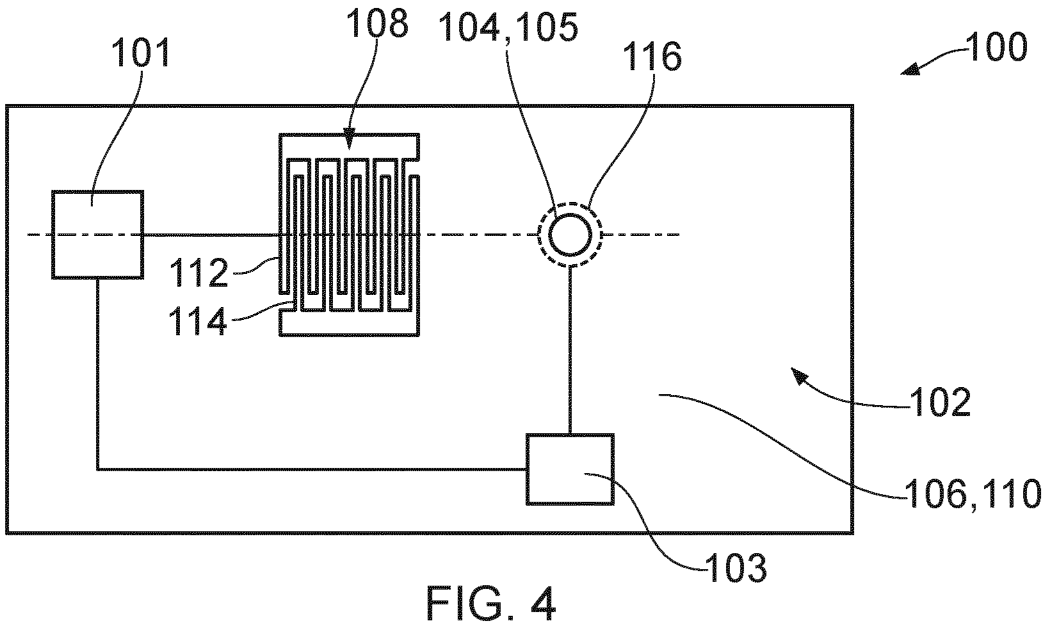
FIG. 4 represents an aerosol generator identical to that of FIG. 1 except in that it does not comprise a reflector.

The embodiment of FIG. 4 is identical to that of FIGS. 1 to 3 except in that no reflector is provided. Hence, only the surface acoustic waves that reach the liquid aerosol-forming substrate in the atomisation region 116 are reflected by the liquid aerosol-forming substrate towards the transducer 108. When the reflected surface acoustic waves reach the transducer 108, the controller 110 operates the transducer as an output transducer for sensing the reflected surface acoustic waves. The controller can control the transducer 108, when operated as an input transducer, and the flow control element 103 as in the embodiments of FIGS. 1 to 3.

Figure 5:
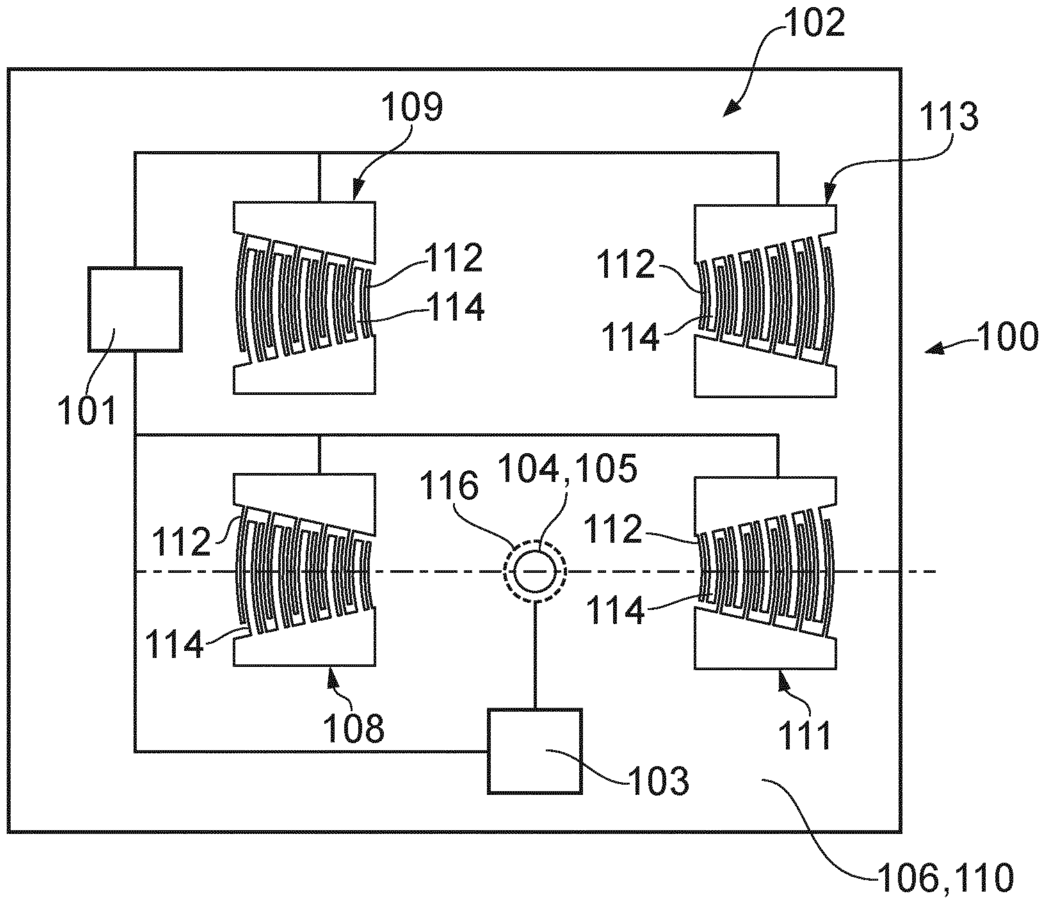
FIG. 5 illustrates a top view of an aerosol generator comprising a first transducer, a second transducer, a first reflector and a second reflector.

In the embodiment of FIG. 5, a surface acoustic wave atomiser 102 of an aerosol generator 100 comprises a substrate 106 in turn comprising a sheet of piezoelectric material, a first transducer 108, a second transducer 109, a third transducer 111 and a fourth transducer 113. The first 108, second 109, third 111 and fourth 113 transducers are arranged on an active surface 110 of the substrate 106.

Each of the transducers 108, 109, 111, 113 comprises a first array of electrodes 112 and a second array of electrodes 114 interleaved with the first array of electrodes 112. The first and second arrays of electrodes of each of the transducers 108, 109, 111, 113 are curved and parallel with each other.

A controller 101 is configured to operate each of the first transducer 108 and the second transducer 109 as an input transducer for generating surface acoustic waves on the active surface 110 of the substrate 106. The third transducer 111 is positioned to receive surface acoustic waves generated by the first transducer 108, and the controller 101 is configured to operate the third transducer 111 as an output transducer for sensing surface acoustic waves generated by the first transducer 108. Likewise, the fourth transducer 113 is positioned to receive surface acoustic waves generated by the second transducer 109, and the controller 101 is configured to operate the fourth transducer 113 as an output transducer for sensing surface acoustic waves generated by the second transducer 109.

During use, each of the first 108 and second 109 transducers generates surface acoustic waves on the active surface 110 of the substrate 106. The curved shape of the first 112 and second 114 arrays of electrodes of the first transducer 108 results in surface acoustic waves having a concave wavefront focussed towards the atomisation region 116 on the active surface 110 of the substrate 106 and towards the third transducer 111. The curved shape of the first 112 and second 114 arrays of electrodes of the second transducer 109 results in surface acoustic waves having a concave wavefront focussed towards the fourth transducer 113.

The atomisation region 116 is positioned only between the first transducer 108 and the third transducer 111. Hence, the second transducer 109 and the fourth transducer 113 may be configured to form a reference sensor, whereas the first transducer 108 and the third transducer 111 may form a sensor configured to sense the liquid aerosol-forming substrate within the atomisation region 116.

The second transducer 111 generates an output signal which is a function of the properties of the sensed liquid aerosol-forming substrate. Likewise, the fourth transducer 113 generates an output signal which is independent from the properties of the liquid aerosol-forming substrate in the atomisation region 116. The output signal of the fourth transducer 113 can thus be used as a reference output signal. The output signals from the third 111 and fourth 113 transducers are received by the controller 101, which can thus compare the output signal of the third transducer 111 to the reference output signal of the fourth transducer 113.

As a result of this comparison, the controller 101 can modify the input signal sent to the first transducer 108, which adapts the generation of surface acoustic waves to enhance the atomisation of the liquid aerosol-forming substrate.

The controller 101 of FIG. 5 also utilises the comparison between the output signal of the third transducer 111 and the reference output signal of the fourth transducer 113 to provide an input signal to a flow control element 103. The flow control element 103 adapts the flow rate of the liquid aerosol-forming substrate to the atomisation region 116 on the active surface 110 of the substrate 106, by means of a supply element 104, to enhance the atomisation of liquid aerosol-forming substrate.

The controller 101 can be configured to control the first 108 and second 109 transducers in such a way that they generate identical surface acoustic waves. This may be beneficial to ensure that the comparison between the output signal of the third transducer 111 and the reference output signal of the fourth transducer 113 is consistent.

Figure 6:
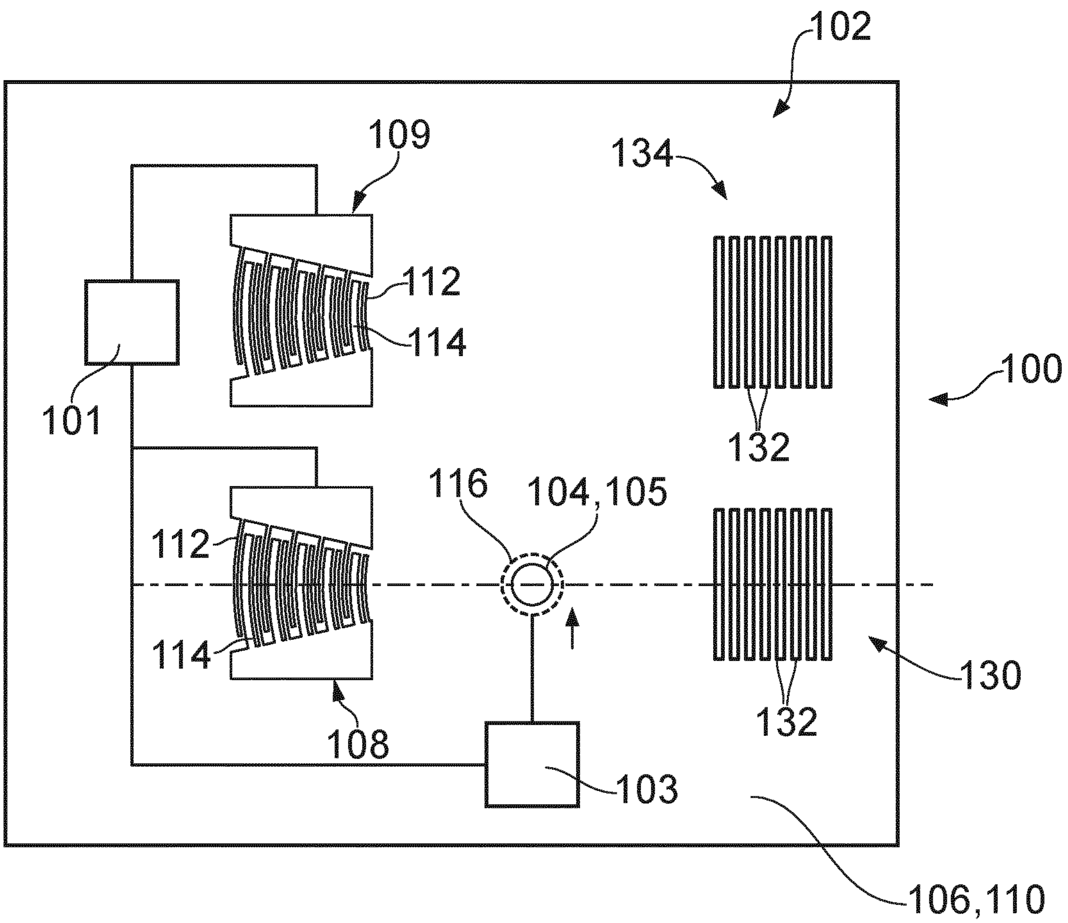
FIG. 6 depicts a top view of an aerosol generator comprising a first transducer, a second transducer, a third transducer and a fourth transducer.

In the embodiment of FIG. 6, a surface acoustic wave atomiser 102 of an aerosol generator 100 comprises a substrate 106 in turn comprising a sheet of piezoelectric material, a first transducer 108 and a second transducer 109. The aerosol generator 100 also comprises a first reflector 130 and a second reflector 134. The first transducer 108, second transducer 109, first reflector 130 and second reflector 134 are arranged on an active surface 110 of the substrate 106.

Each of the transducers 108, 109 comprises a first array of electrodes 112 and a second array of electrodes 114 interleaved with the first array of electrodes 112. The first and second arrays of electrodes of each of the transducers 108, 109 are curved and parallel with each other.

A controller 101 is configured to operate the first transducer 108 and the second transducer 109. For this reason, the controller 101 is electrically connected to the first transducer 108 and the second transducer 109. The controller 101 is configured to operate the first transducer 108 and the second transducer 109 as input transducers for generating surface acoustic waves on the active surface 110 of the substrate 106. The controller 101 is also configured to operate the first transducer 108 and the second transducer 109 as output transducers for sensing surface acoustic waves on the active surface 110 of the substrate 106.

The aerosol generator 100 comprises a first reflector 130 positioned on the active surface 110 of the substrate 106 so that the atomisation region 116 is positioned only between the transducer 108 and the first reflector 130. The first reflector 130 comprises an array of reflector electrodes 132 each having a linear shape and arranged parallel with each other.

The aerosol generator 100 also comprises a second reflector 134 positioned on the active surface 110 of the substrate 106. The second reflector 134 also comprises an array of reflector electrodes 132 each having a linear shape and arranged parallel with each other.

Since the atomisation region 116 is positioned only between the first transducer 108 and the first reflector 130, the second transducer 109 may be configured to form a reference sensor, whereas the first transducer 108 may form a sensor configured to sense the liquid aerosol-forming substrate within the atomisation region 116.

During use, some of the surface acoustic waves generated by the first transducer 108 may be transmitted entirely through the atomisation region 116, for example if a small amount of liquid aerosol-forming substrate, or no liquid aerosol-forming substrate, is deposited on the atomisation region 116. The first reflector 130 functions to reflect any transmitted surface acoustic waves back towards the atomisation region 116 and towards the first transducer 108. When the reflected surface acoustic waves reach the first transducer 108, the controller 101 operates the first transducer 108 as an output transducer for sensing the reflected surface acoustic waves.

Likewise, during use, the surface acoustic waves generated by the second transducer 109 reach the second reflector 134, which reflects any transmitted surface acoustic waves back towards the second transducer 109. When the reflected surface acoustic waves reach the second transducer 109, the controller 101 operates the second transducer 109 as an output transducer for sensing the reflected surface acoustic waves.

Since the first transducer 108 can be operated as an input transducer and an output transducer, the first transducer 108 forms a sensor which can sense a sample of the liquid aerosol-forming substrate on the atomisation region 116. When the first transducer 108 is operated as an output transducer, it generates an output signal which is a function of the properties of the sensed liquid aerosol-forming substrate.

Similarly, the second transducer 111, when operated as an output transducer, generates an output signal which is independent from the properties of the liquid aerosol-forming substrate in the atomisation region 116. The output signal of the second transducer 109 can thus be used as a reference output signal. The output signals from the first 108 and second 109 transducers are received by the controller 101, which can thus compare the output signal of the first transducer 108 to the reference output signal of the second transducer 109.

As a result of this comparison, the controller 101 can modify the input signal sent to the first transducer 108 when operated as an input transducer. The first transducer 108 can therefore adapt the generation of surface acoustic waves to enhance the atomisation of the liquid aerosol-forming substrate.

The controller 101 of FIG. 6 may also use the comparison between the output signal of the first transducer 108 and the reference output signal of the second transducer 109 to provide an input signal to a flow control element 103. The flow control element 103 adapts the flow rate of the liquid aerosol-forming substrate to the atomisation region 116 on the active surface 110 of the substrate 106, by means of a supply element 104, to enhance the atomisation of liquid aerosol-forming substrate.

The controller 101 can be configured to control the first 108 and second 109 transducer in such a way that they generate identical surface acoustic waves when operated as input transducers. This may be beneficial to ensure that the comparison between the output signal of the first transducer 108 and the reference output signal of the second transducer 109, when operated as output transducers, is consistent.

Figure 7:
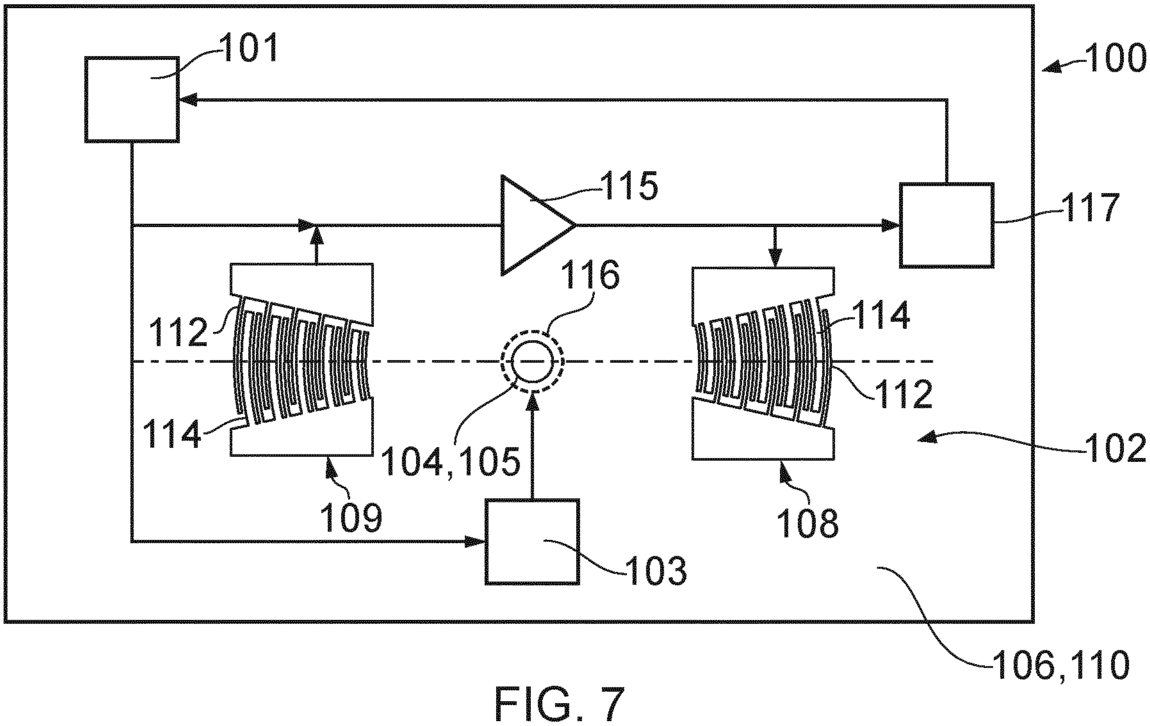
FIG. 7 shows a top view of an aerosol generator comprising a first transducer, a second transducer, an amplifier and an analyser.

In the embodiment of FIG. 7, a surface acoustic wave atomiser 102 of an aerosol generator 100 comprises a substrate 106 in turn comprising a sheet of piezoelectric material, a first transducer 108 and a second transducer 109. The first 108 and second 109 transducers are arranged on an active surface 110 of the substrate 106.

Each of the transducers 108, 109 comprises a first array of electrodes 112 and a second array of electrodes 114 interleaved with the first array of electrodes 112. The first 112 and second 114 arrays of electrodes of each of the first 108 and second 109 transducers are curved and parallel with each other.

The controller 101 is configured to operate the first transducer 108 as an input transducer for generating surface acoustic waves on the active surface 110 of the substrate 106. The second transducer 109 is positioned to receive surface acoustic waves generated by the first transducer 108, and the controller 101 is configured to operate the second transducer 109 as an output transducer for sensing surface acoustic waves generated by the first transducer 108.

During use, the first transducer 108 generates surface acoustic waves on the active surface 110 of the substrate 106. The curved shape of the first 112 and second 114 arrays of electrodes of the first transducer 108 results in surface acoustic waves having a concave wavefront focussed towards an atomisation region 116 on the active surface 110 of the substrate 106 and towards the second transducer 109.

The aerosol generator 100 of FIG. 7 comprises an amplifier 115, such that the first transducer 108 and the second transducer 109 are arranged in such a way that the acoustic wave atomiser 102 is a feedback line for the amplifier 115, as shown in FIG. 6. In particular, in the embodiment of FIG. 7, the second transducer 109 generates an output signal which is a function of the properties of the sensed liquid aerosol-forming substrate. The output signal of the second transducer 109 is amplified by the amplifier 115, which generates an amplifier output signal. The amplifier output signal is received by an analyser 117 which in turns provides an analyser output signal to the controller 101.

The controller 101 can utilise the analyser output signal to modify an input signal sent to the first transducer 108, which adapts the generation of surface acoustic waves to enhance the atomisation of the liquid aerosol-forming substrate.

The controller 101 of FIG. 7 can also use the analyser output signal to provide an input signal to a flow control element 103. The flow control element 103 adapts the flow rate of the liquid aerosol-forming substrate to the atomisation region 116 on the active surface 110 of the substrate 106, by means of a supply element 104, to enhance the atomisation of liquid aerosol-forming substrate.

Figure 8:
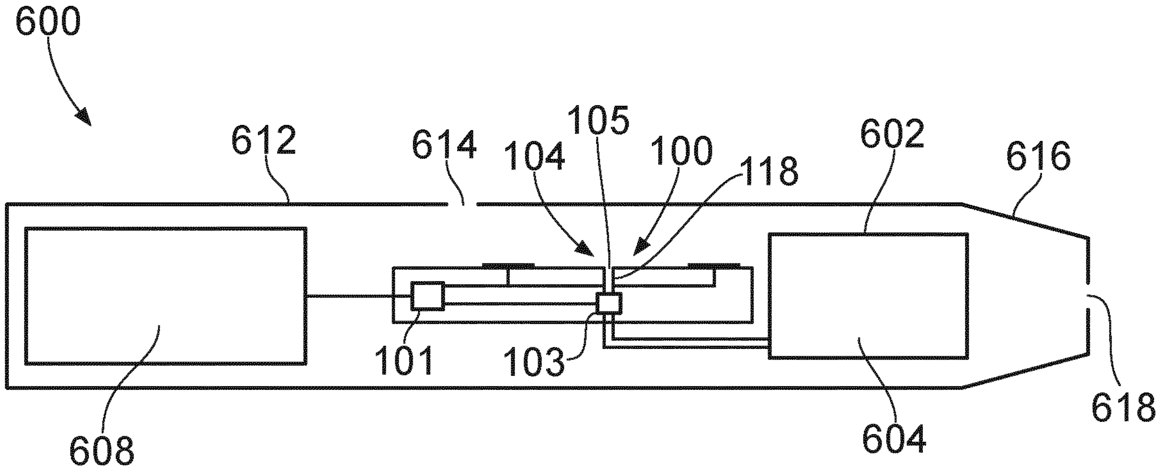
FIG. 8 represents an aerosol-generating device comprising an aerosol generator.

FIG. 8 shows a cross-sectional view of an aerosol-generating device 600 comprising the aerosol generator 100 of any of the embodiments above. The aerosol-generating device 600 also comprises a liquid storage portion 602 containing a liquid aerosol-forming substrate 604. The flow control element 103 of the aerosol generator 100 controls the flow rate of the liquid aerosol-forming substrate 604, by means of the supply element 104, to the atomisation region 116. The supply element 104 comprises a channel 118 and an outlet 105.

The aerosol-generating device 600 also comprises a power supply 608 comprising a rechargeable battery, electrically connected to the controller 101. As explained for the embodiments above, the controller 101 is configured to provide input signals to the flow control element 103 and to the one or more input transducers of the aerosol generator 100.

The aerosol-generating device 600 also comprises a housing 612 in which the aerosol generator 100, the liquid storage portion 602 and the power supply 608 are contained. The housing 612 defines an air inlet 614, a mouthpiece 616, and an air outlet 618. During use, a user draws on the mouthpiece 616 to draw air through the housing 612 from the air inlet 614 to the air outlet 618. Aerosol generated by the aerosol generator 100 is entrained in the airflow through the housing 612 for delivery to the user.

The invention claimed is:

1. An aerosol-generator for an aerosol-generating device, the aerosol-generator comprising:

a surface acoustic wave atomiser comprising:

a substrate comprising an active surface defining an atomisation region, and a transducer disposed on the active surface of the substrate;

a supply element arranged to supply a liquid aerosol-forming substrate to the atomisation region; and a controller configured to:

operate the transducer as an input transducer to generate surface acoustic waves on the active surface of the substrate, operate the transducer as an output transducer to sense surface acoustic waves on the active surface of the substrate, receive an output signal from the transducer when the transducer is operated as the output transducer, provide an input signal to the transducer when the transducer is operated as an input transducer, and vary the input signal to control the input transducer based on the output signal received by the controller from the transducer when the transducer is operated as an output transducer.

2. The aerosol-generator according to claim 1, further comprising a flow control element configured to control a flow rate of liquid aerosol-forming substrate supplied to the atomisation region by the supply element, wherein the controller is further configured to:

provide an input signal to the flow control element, and vary the input signal based on the output signal received by the controller from the transducer when the transducer is operated as the output transducer.

3. The aerosol-generator according to claim 1, further comprising a reflector disposed on the active surface of the substrate, wherein the atomisation region is disposed between the transducer and the reflector.

4. The aerosol-generator according to claim 3, wherein the transducer is a first transducer, wherein the reflector is a first reflector, wherein the surface acoustic wave atomiser further comprises:

a second transducer disposed on the active surface of the substrate, wherein the controller is further configured to operate the second transducer as an input transducer to generate surface acoustic waves on the active surface of the substrate, and to operate the second transducer as an output transducer to sense surface acoustic waves, and a second reflector positioned to reflect the surface acoustic waves generated by the second transducer when operated as an input transducer, such that the reflected surface acoustic waves are received by the second transducer when operated as the output transducer, wherein the controller is further configured to receive an output signal from the second transducer when the second transducer is operated as an output transducer, and wherein the atomisation region is disposed only between the first transducer and the first reflector.

5. The aerosol-generator according to claim 1, wherein the substrate is a piezoelectric substrate.

6. An aerosol-generating device, comprising:

an aerosol-generator according to claim 1;

a power supply; and a liquid storage portion configured to receive a liquid aerosol-forming substrate, wherein the supply element is arranged to supply liquid aerosol-forming substrate from the liquid storage portion to the atomisation region.

7. The aerosol-generator according to claim 4, wherein the controller is further configured to compare the output signal of the first transducer and the output signal of the second transducer to adapt control parameters of one or both of:

the first transducer when operated by the controller as the input transducer, and the second transducer when operated by the controller as the input transducer.

8. The aerosol-generator according to claim 4, wherein:

the output signal of the first transducer is a function of properties of sensed liquid aerosol-forming substrate, the output signal of the second transducer is independent from properties of liquid aerosol-forming substrate in the atomisation region, such that the output signal of the second transducer is a reference output signal, and the controller is further configured to compare the output signal of the first transducer with the reference output signal of the second transducer to adapt control parameters of one or both of:

the first transducer when operated by the controller as the input transducer; and the second transducer when operated by the controller as the input transducer.

* * * * *